(12) United States Patent
Suzuki et al.

(10) Patent No.: US 9,416,342 B2
(45) Date of Patent: Aug. 16, 2016

(54) SPARKLING ALCOHOLIC BEVERAGE AND PROCESS FOR PRODUCING THE SAME

(75) Inventors: Hajime Suzuki, Itami (JP); Makoto Tachibe, Itami (JP); Shozo Sugano, Itami (JP)

(73) Assignee: MATSUTANI CHEMICAL INDUSTRY CO., LTD., Hyogo (JP)

( * ) Notice: Subject to any disclaimer, the term of this patent is extended or adjusted under 35 U.S.C. 154(b) by 365 days.

(21) Appl. No.: 12/263,880

(22) Filed: Nov. 3, 2008

(65) Prior Publication Data
US 2009/0117225 A1    May 7, 2009

(30) Foreign Application Priority Data

Nov. 2, 2007  (JP) .................................. 2007-286348

(51) Int. Cl.
*C12G 3/02*     (2006.01)
*C12G 3/04*     (2006.01)
*C12C 5/00*     (2006.01)

(52) U.S. Cl.
CPC ... *C12G 3/04* (2013.01); *C12C 5/00* (2013.01); *C12G 3/02* (2013.01)

(58) Field of Classification Search
CPC .............. C12C 5/00; C12G 3/02; C12G 3/04
USPC ................... 426/592, 11, 15, 16, 18
See application file for complete search history.

(56) References Cited

U.S. PATENT DOCUMENTS

| | | | |
|---|---|---|---|
| 3,505,110 A * | 4/1970 | Kesler et al. | 127/29 |
| 4,680,180 A * | 7/1987 | Bussiere et al. | 426/16 |
| 6,488,980 B1 * | 12/2002 | Jeffcoat et al. | 426/661 |
| 2003/0148011 A1 * | 8/2003 | Trksak et al. | 426/590 |

FOREIGN PATENT DOCUMENTS

| | | | |
|---|---|---|---|
| CN | 1371985 A | | 10/2002 |
| CN | 1457704 A | | 11/2003 |
| GB | 2181450 A | * | 4/1987 |
| JP | 48080797 A | * | 10/1973 |
| JP | 06-237751 A | | 8/1994 |
| JP | 08-000249 A | | 1/1996 |
| JP | 11-127839 A | | 5/1999 |
| JP | 2002-191347 A | | 7/2002 |
| JP | 2004-081171 A | | 3/2004 |
| JP | 2006-006342 A | | 1/2006 |
| JP | 2006-166758 A | | 6/2006 |
| JP | 2006-166758 | * | 6/2008 |

OTHER PUBLICATIONS

Chinese Office Action dated Jul. 1, 2011 corresponding to Chinese Application No. 200810799459.
Chikage et al., "Modified Starch with Unique Textures", Food Chemical (A Technical Journal on Food Chemistry & Chemicals), 2005, vol. 21, No. 8, pp. 34-37.

* cited by examiner

*Primary Examiner* — Vera Stulii
(74) *Attorney, Agent, or Firm* — Sughrue Mion, PLLC

(57) ABSTRACT

The invention provides a sparkling alcoholic beverage produced using, as a part of ingredients thereof, at least one selected from the group consisting of etherified starch, etherified cross-linked starch and enzymatic hydrolysates thereof; and a method for producing the sparkling alcoholic beverage, wherein at least one selected from the group consisting of etherified starch, etherified cross-linked starch and enzymatic hydrolysates thereof is added in any step of the production process.

The sparkling alcoholic beverage of the invention has good body and prolonged froth duration and contains water-soluble dietary fiber.

1 Claim, No Drawings

SPARKLING ALCOHOLIC BEVERAGE AND PROCESS FOR PRODUCING THE SAME

FIELD OF THE INVENTION

The present invention relates to a sparkling alcoholic beverage and a process for producing the same.

BACKGROUND ART

Although manufacturing techniques for alcoholic beverages have almost been conventionally established, there are changes in preference with times, and technological development is being carried out in response to changes in basic ingredients used. In Japan, for example, low-cost sparkling alcoholic beverages command a large sale due to an economic slump and the like, whereas in the U.S., low-calorie alcoholic beverages such as those with low carbohydrate are attracting attention because of increased health consciousness. Product developments are being carried out in response to these trends.

As a result, alcoholic beverages which have decreased body in taste and lost their original flavors are increasing. In some cases, water-soluble dietary fiber (Patent Documents 1-3) and sugar alcohol (Patent Document 4) are added to endow good body in taste, but only a small number of such products have been placed on the market due to such as impacts on their costs and on qualities of taste.

On the other hand, processes for producing a sparkling alcoholic beverage and a malt alcoholic beverage characterized in that froth duration is prolonged by using starch octenyl succinate as an auxiliary ingredient have been disclosed (Patent Document 5).

Nevertheless, there has been no disclosure for a sparkling alcoholic beverage which has strong body and prolonged froth duration, and are able to supply dietary fiber and inexpensive.

[Patent Document 1] JP-A-8-000249
[Patent Document 2] JP-A-2002-191347
[Patent Document 3] JP-A-2006-006342
[Patent Document 4] JP-A-11-127839
[Patent Document 5] JP-A-2006-166758

DISCLOSURE OF THE INVENTION

Problems to be Solved by the Invention

An object of the present invention is to provide a sparkling alcoholic beverage and a process for producing the same, which sparkling alcoholic beverage has strong body, prolonged froth duration and contains water-soluble dietary fiber, using auxiliary ingredients which are less expensive than those used conventionally.

Means for Solving the Problems

The present inventors have produced a sparkling alcoholic beverage using etherified starch and/or etherified cross-linked starch as an auxiliary ingredient(s) to discover that the resulting products surprisingly have strong body and prolonged froth duration and contain considerable amounts of water-soluble dietary fiber, thereby reaching the present invention.

That is, the present invention provides a sparkling alcoholic beverage and a process for producing the same as shown below.

(1) A sparkling alcoholic beverage produced by using, as a part of ingredients thereof, at least one selected from the group consisting of etherified starch, etherified cross-linked starch and enzymatic hydrolysates thereof
(2) The sparkling alcoholic beverage according to the above item (1), wherein said etherified starch is hydroxypropyl starch.
(3) The sparkling alcoholic beverage according to the above item (1), wherein said etherified cross-linked starch is hydroxypropylated phosphate cross-linked starch.
(4) The sparkling alcoholic beverage according to any one of the above items (1) to (3), wherein the content of water-soluble dietary fiber in the product is 0.1-10% by mass.
(5) A method for producing a sparkling alcoholic beverage according to any one of the above items (1) to (4), wherein at least one selected from the group consisting of etherified starch, etherified cross-linked starch and enzymatic hydrolysates thereof is added in any step of the production process.
(6) The method for producing a sparkling alcoholic beverage according to the above item (5), wherein the step in which said addition is carried out is the step before a fermentation step.

Effects of the Invention

According to the present invention, a sparkling alcoholic beverage endowed with good body can be produced more effectively and economically than ever before. Especially, a sparkling alcoholic beverage which has strong body can be provided even when no malt is used or the amount of malt used is largely decreased.

Moreover, since froth duration of a sparkling alcoholic beverage can be improved according to the present invention, there will be an effect of giving a visual appeal to those who drink the beverage as a sparkling alcoholic beverage and, at the same time, in so-called beers, an effect of maintaining its flavor by isolating the surface of the beverage from air is provided.

Furthermore, according to the present invention, dietary fiber components can be included in a sparkling alcoholic beverage. This complies with the recent increase in health consciousness.

Best Modes for Carrying Out the Invention

The sparkling alcoholic beverage of the present invention is a general term for sparkling beverages containing as final products at least 0.1% of alcohol, and examples thereof include beers, sparkling liquors, beer-like alcoholic beverages produced without malt, liqueurs, cocktails and the like. Among the sparkling alcoholic beverages of the present invention, alcoholic beverages so-called beers are defined differently depending on countries. In Japan, for example, they are roughly classified into three categories based on the amounts of basic ingredients and malt used, whereas in the U.S., there are regulations concerning with the amount of malt used, the amount of hops used and alcohol concentration.

As long as the etherified starch and etherified cross-linked starch used in the present invention contain not less than 1% by mass of components which are indigestible by yeast upon hydrolyzation by an amylolytic enzyme, the sources and the processes for production thereof are not restricted. The most preferable source for the starch is waxy corn, and other examples include corn, high-amylose corn, potato, wheat, rice, glutinous rice, tapioca, various beans and the like.

The most preferable etherified starch used in the present invention is hydroxypropyl starch. The production process of hydroxypropyl starch is not restricted, and it can be produced, for example, by reacting slurry of a material starch with propylene oxide under alkaline condition.

The most preferable etherified cross-linked starch used in the present invention is hydroxypropylated phosphate cross-linked starch. The production process of hydroxypropylated phosphate cross-linked starch used in the present invention is not restricted, and it can be produced, for example, by adding phosphorus oxychloride to slurry of a material starch under alkaline condition to react with each other and subsequently reacting the resulting product with propylene oxide.

The etherified starch and etherified cross-linked starch used in the present invention may be those treated with physical treatments such as pregelatinization treatment, roasting treatment, heat-moisture treatment and warm water treatment and enzymatic hydrolysis treatment and the like, before or after etherification.

The pregelatinization treatment is not restricted, and it may be carried out, for example, by treatment of the starch emulsion with a heated roll which is heated to about 150° C.

The roasting treatment may be carried out under a condition conventionally used for preparation of roasted dextrin (for example, under acidic condition, at about 150° C. for 30-60 minutes). The heat-moisture treatment may be carried out, for example, under 100% humidity, at 120-130° C. for 30-60 minutes.

The warm water treatment may be carried out, for example, by incubating in warm water at a temperature above room temperature but below gelatinization temperature for 6-72 hours.

The enzymatic hydrolysis treatment is also not restricted, and it may be carried out, for example, by addition of a commercially available amylolytic enzyme such as α-amylase, glucoamylase, isoamylase, pullulanase, β-amylase or the like to a starch slurry and a subsequent treatment at about an optimum temperature for 30 minutes to 15 hours.

As used herein, "water-soluble dietary fiber" means one measured by the AOAC method 2001.03.

The process for producing the sparkling alcoholic beverage of the present invention will now be described below.

The etherified starch and/or etherified cross-linked starch used for the sparkling alcoholic beverage of the present invention may be used by adding as they are or after being hydrolyzed by an enzyme in any step of the production process as a part of ingredients depending on the type of the product of interest.

Other ingredients used for the present invention include cereals; tubers; malt; starch; hops or hop extracts; plant proteins such as soy proteins; plant peptides such as soybean peptides; saccharides such as maltose; starch hydrolysates such as dextrin; sugar alcohols; water-soluble dietary fibers; acidulants such as citric acid; polysaccharide thickeners; vitamins; fruit juices; flavors; dairy products; dietary salt; potassium chloride; high intensity sweeteners such as stevia and aspartame; and the like.

Explanation will now be given by way of examples wherein beer-flavored sparkling alcoholic beverages are produced using different amounts of malt.

For example, in cases where the amount of malt used is sufficiently large such as in beer, the etherified starch and/or etherified cross-linked starch is added preferably during a saccharification process wherein it is hydrolyzed by the action of the amylolytic enzyme in malt up to the limit, to produce yeast-digestible saccharides and yeast-indigestible carbohydrates. The former are utilized by yeast during a fermentation process and hydrolyzed into ethanol and carbon dioxide, whereas a part of the latter remains in the product as water-soluble dietary fiber.

On the other hand, in cases where the amount of malt used is limited such as for sparkling liquors, or in cases where no malt is used such as for other miscellaneous liquors, the etherified starch and/or etherified cross-linked starch is not or incompletely hydrolyzed by the action of the amylolytic enzyme in malt. In this case, the effect of the present invention can be exerted by addition, preferably in the step before fermentation, of the starch used in the present invention which has been preliminarily hydrolyzed by a commercially available amylolytic enzyme such as α-amylase or glucoamylase.

The amount of at least one selected from the group consisting of etherified starch, etherified cross-linked starch and enzymatic hydrolysates thereof to be added is not restricted, and these may preferably be added so as to attain the content of water-soluble dietary fiber in the product to become not less than 0.5% by mass, preferably 1.0-5.0% by mass. Specifically, the amount of at least one selected from the group consisting of etherified starch, etherified cross-linked starch and enzymatic hydrolysates thereof to be added is preferably 1-40 parts by mass, more preferably 2-20 parts by mass based on 100 parts by mass of the final product.

Since the water-soluble dietary fiber originated from the starch used in the present invention can be preliminarily measured and measurement thereof is reflected to the content of the water-soluble dietary fiber in the product, the amount of starch to be used can be determined by calculation.

Timing for the addition is not restricted, and is preferably in the step before a fermentation step. The reason comes from the fact that complexity of the sterilization process can be avoided in addition to the above described reason.

Hydrolysates of the etherified starch and etherified cross-linked starch used in the present invention may also be used for liqueurs. By using them for producing carbonic acid-based liqueurs, for example, shochu-based beverages (Japanese distilled spirit and soda), increased body and prolonged froth duration can be achieved. The additive amount may be controlled in the same manner as in the above-described cases with beer-flavored sparkling alcoholic beverages produced using different amounts of malt. Again, the timing for the addition is not restricted.

The thus produced sparkling alcoholic beverages are particularly characterized by good body (rich taste), prolonged froth duration and an effect by dietary fiber effect all together compared to conventional dietary fiber-containing sparkling alcoholic beverages. Furthermore, since such effects may be achieved merely by using etherified starch and/or etherified cross-linked starch which are chemically modified starches or hydrolysates thereof as a part of ingredients, an increase in the production cost can be minimized. Also, the effects of the present invention do not cause any problems even when used in combination with known water-soluble dietary fibers.

The present invention will now be described in detail by way of Examples and Reference Examples. However, the present invention is not restricted to these Examples. Unless otherwise specified in the following Examples and Reference Examples, "parts" represents "parts by mass", and "%" represents "% by mass". All basic ingredients and auxiliary ingredients used in the following Examples are commercially available.

REFERENCE EXAMPLE 1

A slurry was prepared by adding 20 parts of sodium sulfate and 100 parts of waxy corn starch to 130 parts of water. To the slurry, 30 parts of aqueous 3% sodium hydroxide solution was added under stirring, followed by addition of 8 parts of propylene oxide. After reacting at 40° C. for 20 hours, the resultant was neutralized with hydrochloric acid, washed with water, dehydrated and dried to obtain Starch No. 1 (etherified starch). The content of water-soluble dietary fiber in this starch was 46%.

REFERENCE EXAMPLE 2

A slurry was prepared by adding 30 parts of sodium sulfate and 100 parts of corn starch to 130 parts of water. To the slurry, 30 parts of aqueous 3% sodium hydroxide solution was added under stirring, followed by addition of 14 parts of propylene oxide. After reacting at 40° C. for 20 hours, the resultant was neutralized with hydrochloric acid, washed with water, dehydrated and dried to obtain Starch No. 2 (etherified starch). The content of water-soluble dietary fiber in this starch was 60%.

REFERENCE EXAMPLE 3

A slurry was prepared by adding 15 parts of sodium sulfate and 100 parts of waxy corn starch to 130 parts of water. To the slurry, 30 parts of aqueous 3% sodium hydroxide solution and 0.1 part of phosphorus oxychloride were added under stirring, followed by reacting the resulting mixture at 40° C. for 1 hour. To the obtained sample, 10 parts of propylene oxide was added. After reacting the resulting mixture at 40° C. for 20 hours, the resultant was neutralized with hydrochloric acid, washed with water, dehydrated and dried to obtain Starch No. 3 (etherified cross-linked starch). The content of water-soluble dietary fiber in this starch was 51%.

REFERENCE EXAMPLE 4

A slurry was prepared by adding 20 parts of sodium sulfate and 100 parts of corn starch to 130 parts of water. To the slurry, 30 parts of aqueous 3% sodium hydroxide solution and 0.1 part of phosphorus oxychloride were added under stirring, followed by reacting the resulting mixture at 40° C. for 1 hour. To the obtained sample, 10 parts of propylene oxide was added. After reacting the resulting mixture at 40° C. for 20 hours, the resultant was neutralized with hydrochloric acid, washed with water, dehydrated and dried to obtain Starch No. 4 (etherified cross-linked starch). The content of water-soluble dietary fiber in this starch was 70%.

EXAMPLE 1

Brewing of beers was carried out using etherified starch and etherified cross-linked starch. According to the following recipes in Table 1, malt, water, various types of starch, and hop extract were mixed. The resulting mixtures were warmed to 67° C. and the saccharification reaction was carried out for 60 minutes. The resulting product was warmed to 80° C. and boiled for 30 minutes, followed by filtration of the residue.

TABLE 1

|  | Sample 1 | Sample 2 | Sample 3 | Sample 4 |
|---|---|---|---|---|
| Malt | 28.6 g | 28.6 g | 28.6 g | 28.6 g |
| Corn starch | 12.6 g | 12.6 g | 10.1 g | 6.0 g |
| Starch No. 1*[1] |  |  | 11.2 g |  |
| Starch No. 2*[2] |  |  |  | 7.2 g |
| Fibersol 2*[3] |  | 4.5 g |  |  |
| Hop extract | 2.0 g | 2.0 g | 2.0 g | 2.0 g |

TABLE 1-continued

|  | Sample 1 | Sample 2 | Sample 3 | Sample 4 |
|---|---|---|---|---|
| Final weight including water | 300 g | 300 g | 300 g | 300 g |

*[1]Water-soluble dietary fiber content: 46%
*[2]Water-soluble dietary fiber content: 70%
*[3]Indigestible dextrin (Matsutani Chemical industry Co., Ltd., Japan); Water-soluble dietary fiber content: 90%

To each filtrate, 0.2 g of ale yeast was added, and primary fermentation was carried out at 20° C. for 10 days, followed by lagering for 21 days to obtain 300 g each of beer samples.

Table 2 shows the results of analyses of these samples. Body of each sample obtained was evaluated by 5 panelists, whose consensus was summarized by rating on a 10-point scale (from 10: best to 1: worst). The results are shown in Table 2.

TABLE 2

|  | Sample 1 | Sample 2 | Sample 3 | Sample 4 |
|---|---|---|---|---|
| Percent alcohol by volume | 5.0% | 4.9% | 5.0% | 5.0% |
| Residual extract | 3.3% | 4.8% | 4.8% | 4.8% |
| Water-soluble dietary fiber content | 0.0 g | 1.5 g | 1.5 g | 1.5 g |
| Evaluation of body | 2 | 5 | 10 | 8 |

Water-Soluble Dietary Fiber Contents per 100 ml are Presented.

Clear differences in body were found between Sample 1 and Samples 2-4; and Samples 3 and 4 showed clear differences in body compared to Sample 2.

EXAMPLE 2

Brewing of sparkling liquors was carried out using etherified starch and etherified cross-linked starch. Each starch was preliminarily hydrolyzed (saccharified) by a commercially available amylolytic enzyme and used as a starch hydrolyzation product (saccharification product). That is, Starch No. 1 obtained in Reference Example 1 or Starch No. 4 obtained in Reference Example 4 was made into a 30% suspension, and 0.1% Termamyl 120L (Novozymes A/S) was added thereto, followed by reacting at 90° C. for 30 minutes. Then, pH was adjusted to 4.5, and 0.4% Gluczyme NL4.2 (Amano Enzyme Inc.) was added thereto, after which the reaction was carried out at 60° C. for 16 hours. The reacted solution was filtered through diatomaceous earth before use.

To produce the sparkling liquors, malt extract, water, each of starch saccharification products, hop extract, soybean peptide and maltose were mixed according to the following recipes in Table 3. The resulting mixture was warmed to 80° C. and boiled for 30 minutes, followed by filtration of the residue.

TABLE 3

|  | Sample 5 | Sample 6 | Sample 7 | Sample 8 |
|---|---|---|---|---|
| Malt extract (Bx = 75) | 13.0 g | 13.0 g | 13.0 g | 13.0 g |
| Corn starch saccharification product*[4] | 112.5 g | 112.5 g |  |  |
| Starch No. 1 saccharification product*[5] |  |  | 58.3 g |  |
| Starch No. 4 |  |  |  | 42.9 g |

TABLE 3-continued

|  | Sample 5 | Sample 6 | Sample 7 | Sample 8 |
|---|---|---|---|---|
| saccharification product*6 |  |  |  |  |
| Maltose |  |  | 18.7 g | 22.1 g |
| Fibersol 2*3 |  | 4.5 g |  |  |
| Hop extract | 2.0 g | 2.0 g | 2.0 g | 2.0 g |
| Soybean peptide | 1.0 g | 1.0 g | 1.0 g | 1.0 g |
| Final weight including water | 300 g | 300 g | 300 g | 300 g |

*4Solids concentration: 13.6%; content of digestible saccharides: 98%
*5Solids concentration: 16.8%; Water-soluble dietary fiber content: 46%
*6Solids concentration: 15.0%; Water-soluble dietary fiber content: 70%

To each filtrate, 0.2 g of ale yeast was added, and primary fermentation was carried out at 20° C. for 10 days, followed by lagering for 21 days to obtain 300 g each of sparkling liquor samples.

Table 4 shows the results of the analyses of these samples. Body of each sample obtained was evaluated in the same manner as in Example 1 and the results are shown in Table 4.

TABLE 4

|  | Sample 5 | Sample 6 | Sample 7 | Sample 8 |
|---|---|---|---|---|
| Percent alcohol by volume | 5.0% | 4.9% | 5.0% | 5.0% |
| Residual extract | 1.3% | 2.8% | 2.8% | 2.8% |
| Water-soluble dietary fiber content | 0.0 g | 1.5 g | 1.5 g | 1.5 g |
| Evaluation of body | 1 | 4 | 9 | 8 |

Water-Soluble Dietary Fiber Contents per 100 ml are Presented.

Clear differences in body were found between Sample 5 and Samples 6-8; and Samples 7 and 8 showed clear differences in body compared to Sample 6. Thus, the effect of the present invention can be sufficiently exerted even when using hydrolysates of etherified starch and/or etherified cross-linked starch which were hydrolyzed by a commercially available amylolytic enzyme, but not a diastatic enzyme contained in malt.

EXAMPLE 3

Brewing of sparkling alcoholic beverages in which malt is not used was carried out using etherified starch and etherified cross-linked starch. Each starch was preliminarily hydrolyzed in the same manner as in Example 2 using a commercially available amylolytic enzyme and was used as a starch hydrolyzation product (saccharification product).

To produce the sparkling alcoholic beverages in which malt is not used, water, each of starch saccharification products, dextrin, hop extract, soybean peptide and maltose were mixed according to the following recipes in Table 5. The resulting mixture was warmed to 80° C. and boiled for 30 minutes, followed by filtration of the residue.

TABLE 5

|  | Sample 9 | Sample 10 | Sample 11 | Sample 12 |
|---|---|---|---|---|
| Corn starch saccharification product*4 | 120 g | 120 g |  |  |
| Starch No. 1 saccharification product*7 |  |  | 70.6 g |  |
| Starch No. 4 saccharification product*8 |  |  |  | 58.0 g |
| Dextrin*9 | 6.7 g | 1.7 g | 1.7 g | 1.7 g |
| Maltose | 14.4 g | 14.9 g | 25.0 g | 27.6 g |
| Fibersol 2*3 |  | 4.5 g |  |  |
| Hop extract | 2.0 g | 2.0 g | 2.0 g | 2.0 g |
| Soybean peptide | 1.0 g | 1.0 g | 1.0 g | 1.0 g |
| Final weight including water | 300 g | 300 g | 300 g | 300 g |

*7Solids concentration: 13.2%; Water-soluble dietary fiber content: 46%
*8Solids concentration: 11.6%; Water-soluble dietary fiber content: 70%
*9Water-soluble dietary fiber content: 0%

To each filtrate, 0.2 g of ale yeast was added, and primary fermentation was carried out at 20° C. for 10 days, followed by lagering for 21 days to obtain 300 g each of sparkling liquor samples.

Table 6 shows the results of analyses of these samples. Body of each sample obtained was evaluated in the same manner as in Example 1 and the results are shown in Table 6.

TABLE 6

|  | Sample 9 | Sample 10 | Sample 11 | Sample 12 |
|---|---|---|---|---|
| Percent alcohol by volume | 5.0% | 5.0% | 5.0% | 5.0% |
| Residual extract | 2.0% | 2.0% | 2.0% | 2.0% |
| Water-soluble dietary fiber content | 0.0 g | 1.5 g | 1.5 g | 1.5 g |
| Evaluation of body | 2 | 6 | 10 | 9 |

Water-Soluble Dietary Fiber Contents per 100 ml are Presented.

Clear differences in body were found between Sample 9 and Samples 10-12; and Samples 11 and 12 showed clear differences in body compared to Sample 10. Thus, the present invention is effective also in a system wherein no malt is added at all.

EXAMPLE 4

Liqueur beverages were produced using etherified starch. The liqueur beverages were produced by mixing according to the following recipes in Table 7. With regard to Starch No. 3, the saccharification product of Starch No. 3 obtained in Reference Example 3 was preliminarily hydrolyzed in the same manner as in Example 2 using a commercially available amylolytic enzyme and then converted to powders by spray drying, which powders were used as a starch hydrolyzation product (saccharification product).

TABLE 7

|  | Sample 13 | Sample 14 | Sample 15 | Sample 16 |
|---|---|---|---|---|
| Fructose | 3.0 g | 3.0 g | 3.0 g | 3.0 g |
| Starch No. 3 saccharification product*10 |  |  |  | 2.5 g |
| Dextrin*9 |  | 2.5 g |  |  |
| Fibersol 2*3 |  |  | 2.5 g |  |
| Citric acid | 0.07 g | 0.07 g | 0.07 g | 0.07 g |
| Vitamin C | 0.02 g | 0.02 g | 0.02 g | 0.02 g |
| Potassium chloride | 0.01 g | 0.01 g | 0.01 g | 0.01 g |
| 20% lemon juice | 0.4 g | 0.4 g | 0.4 g | 0.4 g |
| Flavor | 0.1 g | 0.1 g | 0.1 g | 0.1 g |
| Carbonated water | added up | added up | added up | added up |

TABLE 7-continued

|  | Sample 13 | Sample 14 | Sample 15 | Sample 16 |
|---|---|---|---|---|
| White liquor ※ | to 100 ml | to 100 ml | to 100 ml | to 100 ml |

※ Samples were prepared to be 7% alcohol/100 ml.
*[10]Water-soluble dietary fiber content: 51%

Table 8 shows the water-soluble dietary fiber contents of these samples. In addition, body of each sample obtained was evaluated in the same manner as in Example 1 and the results are shown in Table 8.

TABLE 8

|  | Sample 13 | Sample 14 | Sample 15 | Sample 16 |
|---|---|---|---|---|
| Water-soluble dietary fiber content | 0.0 g | 0.0 g | 2.2 g | 1.3 g |
| Evaluation of body | 1 | 4 | 6 | 10 |

Water-Soluble Dietary Fiber Contents per 100 ml are Presented.

Sample 13 did not have good body, Samples 14 and 15 had moderate body, and Sample 16 was felt to have strong body. Thus, the present invention is effective not only in cases where hydrolysates of etherified starch and/or etherified cross-linked starch were mixed before a fermentation step in the production process but also in cases where being mixed after the fermentation step.

EXAMPLE 5

Brewing of sparkling liquors was carried out using etherified starch and etherified cross-linked starch. Each starch was preliminarily hydrolyzed by a commercially available amylolytic enzyme and was used as a starch hydrolyzation product (saccharification product). That is, Starch No. 2 obtained in Reference Example 2 or Starch No. 3 obtained in Reference Example 3 was made into a 30% suspension, and 0.1% Termamyl 120L (Novozymes A/S) was added thereto, followed by reacting at 90° C. for 30 minutes. Then, pH was adjusted to 4.5, and 0.4% Gluczyme NL4.2 (Amano Enzyme Inc.) was added, after which the reaction was carried out at 60° C. for 16 hours. The reacted solution was filtered through diatomaceous earth and concentrated for use.

To produce the sparkling liquors, malt extract, water, each of starch saccharification products, hop extract, soybean peptide and maltose were mixed according to the following recipes in Table 9. The resulting mixture was warmed to 80° C. and boiled for 30 minutes, followed by filtration of the residue.

TABLE 9

|  | Sample 17 | Sample 18 | Sample 19 | Sample 20 |
|---|---|---|---|---|
| Malt extract (Bx = 75) | 13.0 g | 13.0 g | 13.0 g | 13.0 g |
| Corn starch saccharification product*[4] | 112.5 g | 112.5 g |  |  |
| Starch No. 2 saccharification product*[11] |  |  | 16.6 g |  |
| Starch No. 3 saccharification product*[12] |  |  |  |  |
| Maltose |  |  | 20.9 g | 19.7 g |
| Fibersol 2 |  | 4.5 g |  |  |
| Hop extract | 2.0 g | 2.0 g | 2.0 g | 2.0 g |
| Soybean peptide | 1.0 g | 1.0 g | 1.0 g | 1.0 g |
| Final weight including water | 300 g | 300 g | 300 g | 300 g |

*[11]Solids concentration: 45.6%; Water-soluble dietary fiber content: 60%
*[12]Solids concentration: 53.8%; Water-soluble dietary fiber content: 51%

To each filtrate, 0.2 g of ale yeast was added, and primary fermentation was carried out at 20° C. for 10 days, followed by lagering for 21 days to obtain 300 g each of sparkling liquor samples.

By tasting of the obtained samples, Samples 19 and 20 had stronger body compared to Samples 17 and 18 similar to the case in Example 3. Therefore, the effect of the present invention was obtained with a good reproducibility.

Subsequently, froth duration was tested using these sparkling liquor samples. Each sparkling liquor stored in a 100 ml bottle was poured into a 200 ml graduated cylinder at normal temperature without cooling. In pouring, samples were quickly transferred from the bottle to the graduated cylinder bringing the mouth of the sample bottle into contact with that of the graduated cylinder. Measurement was carried out at two time points: 10 seconds (a state of froth formation being in progress) and 60 seconds (a state of the froth being stable) after pouring. The amount of the froth in the graduated cylinder was presented in ml.

Results of the measurement are shown in Table 10. Samples 19 and 20 had larger amounts of froth after 10 seconds and 60 seconds, compared to those of Samples 17 and 18. Therefore, the effect of the present invention on froth duration was confirmed.

TABLE 10

|  | After 10 seconds | After 60 seconds |
|---|---|---|
| Sample 17 | 120 ml | 70 ml |
| Sample 18 | 125 ml | 80 ml |
| Sample 19 | 140 ml | 95 ml |
| Sample 20 | 150 ml | 95 ml |

What is claimed is:

1. A method for producing a beer having 4.9% or 5.0% of alcohol content, comprising
    adding at least one ingredient selected from the group consisting of etherified waxy corn starch and etherified cross-linked waxy corn starch to a malt, wherein an amount of the ingredient to be added is 2.4 to 20 parts by mass based on 100 parts by mass of the final product;
    hydrolyzing the ingredient by action of an amylolytic enzyme in the malt to produce a mixture containing a yeast-digestible saccharide and a yeast-indigestible carbohydrate;
    fermenting the mixture to produce ethanol and carbon dioxide from the yeast-digestible saccharide and to maintain a part of the yeast-indigestible carbohydrate as water-soluble dietary fiber; and
    producing a beer having 4.9% or 5.0% of alcohol content.

* * * * *